United States Patent
Konishi et al.

(10) Patent No.: US 8,983,735 B2
(45) Date of Patent: Mar. 17, 2015

(54) OPENING/CLOSING CONTROL DEVICE FOR GRILLE SHUTTER OF VEHICLE

(75) Inventors: Takanori Konishi, Wako (JP); Hisashi Akizuki, Wako (JP); Hideki Takahashi, Wako (JP); Yoshitaka Hirose, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 171 days.

(21) Appl. No.: 13/808,681

(22) PCT Filed: Jun. 9, 2011

(86) PCT No.: PCT/JP2011/063227
§ 371 (c)(1),
(2), (4) Date: Jan. 7, 2013

(87) PCT Pub. No.: WO2012/005077
PCT Pub. Date: Jan. 12, 2012

(65) Prior Publication Data
US 2013/0110356 A1      May 2, 2013

(30) Foreign Application Priority Data

Jul. 8, 2010   (JP) ................................. 2010-155432
Jul. 8, 2010   (JP) ................................. 2010-155433

(51) Int. Cl.
*B62D 37/02*   (2006.01)
*B60K 11/04*   (2006.01)
*B60K 11/08*   (2006.01)

(52) U.S. Cl.
CPC .............. *B62D 37/02* (2013.01); *B60K 11/085* (2013.01); *B60K 11/04* (2013.01)
USPC .......................... 701/49; 123/41.04; 180/68.1

(58) Field of Classification Search
CPC ........ B60K 11/085; B62D 37/02; B62D 6/04; B62D 6/005; B62D 35/005; B62D 25/20; B62D 35/02; B60G 17/016; G01P 3/446; B60R 19/52; G01S 7/03; G01S 13/931
USPC ......... 701/32.9, 49, 82, 300, 31.4; 123/41.04; 296/180.01, 180.05, 193.1; 180/68.1, 180/165; 454/75

See application file for complete search history.

(56) References Cited

U.S. PATENT DOCUMENTS 4,457,558 A  *  7/1984  Ishikawa ..................... 296/180.5
5,322,340 A  *  6/1994  Sato et al. .................. 296/180.1

(Continued)

FOREIGN PATENT DOCUMENTS

DE       3916907       12/1989
JP       57-158171       9/1982

(Continued)

OTHER PUBLICATIONS

European Search Report dated Feb. 11, 2014, 3 pages.

*Primary Examiner* — Tuan C. To
*Assistant Examiner* — Yuri Kan
(74) *Attorney, Agent, or Firm* — Rankin, Hill & Clark LLP

(57) ABSTRACT

An opening/closing control device for a shutter of a vehicle is provided which is capable of appropriately opening and closing the shutter according to the traveling conditions of the vehicle, and improving fuel economy while maintaining excellent maneuverability of the vehicle. When the detected vehicle speed is not smaller than a predetermined first reference value and smaller than a second reference value, the shutter is closed to improve fuel economy. On the other hand, when the vehicle speed is not smaller than the second reference value, the shutter is opened. Further, at this time, a condition for opening the shutter is set according to at least one of a grip force of the vehicle and a steering angle. This maintains excellent vehicle maneuverability.

20 Claims, 13 Drawing Sheets

(56) References Cited

U.S. PATENT DOCUMENTS

| | | | |
|---|---|---|---|
| 6,073,078 A * | 6/2000 | Kitahara et al. | 701/300 |
| 6,857,492 B1 * | 2/2005 | Liskey et al. | 180/165 |
| 2004/0226764 A1 * | 11/2004 | Iwasaki et al. | 180/68.1 |
| 2005/0154510 A1 * | 7/2005 | Fujioka et al. | 701/29 |
| 2006/0259225 A1 * | 11/2006 | Ono et al. | 701/82 |
| 2008/0157566 A1 * | 7/2008 | Tazaki et al. | 296/193.1 |
| 2009/0050385 A1 * | 2/2009 | Guilfoyle et al. | 180/68.1 |
| 2010/0139583 A1 * | 6/2010 | Klotz et al. | 123/41.04 |
| 2011/0251761 A1 * | 10/2011 | Charnesky et al. | 701/49 |
| 2011/0281515 A1 * | 11/2011 | Lockwood et al. | 454/75 |
| 2011/0288717 A1 * | 11/2011 | Yu et al. | 701/29 |

FOREIGN PATENT DOCUMENTS

| | | |
|---|---|---|
| JP | 8-5111 | 2/1996 |
| JP | 2007-001503 | 1/2007 |
| JP | 2008-006855 | 1/2008 |
| JP | 2008-230470 | 10/2008 |

* cited by examiner

OPENING/CLOSING CONTROL DEVICE FOR GRILLE SHUTTER OF VEHICLE

FIELD OF THE INVENTION

The present invention relates to an opening/closing control device for a shutter of a vehicle, which controls the opening/closing of the shutter openably and closably provided at a front part of the vehicle, for introducing ambient air into an engine room through a front opening thereof.

BACKGROUND ART

As a conventional opening/closing control device of this kind, one described e.g. in PTL 1 is known. This opening/closing control device detects a speed of a vehicle (vehicle speed) by a vehicle speed sensor and opens a grille shutter in a low or middle speed operating state in which the detected vehicle speed is smaller than a predetermined speed. On the other hand, in a high speed operating state in which the vehicle speed is not smaller than the predetermined speed, the control device closes the grille shutter, whereby the introduction of ambient air into an engine room is blocked to reduce the resistance of air acting on the vehicle in the high speed operating state to thereby improve fuel economy.

CITATION LIST

Patent Literature 1

[PTL 1] Japanese Patent Application Laid-Open No. 2007-1503

SUMMARY OF INVENTION

Technical Problem

As described above, in this conventional opening/closing control device, in the high speed operating state in which the vehicle speed is not smaller than the predetermined speed, the grille shutter is closed. However, if, in a state in which the grille shutter is closed, the vehicle speed is further increased to place the vehicle in an ultrahigh speed operating state, the flow velocity of air flowing along a bottom part of a vehicle body becomes larger than that of air flowing along a top part of the vehicle body, whereby the difference in applied air pressure between these two parts is increased, causing an increase in the sinking amount of the front part of the vehicle body, and hence the grip force of each tire is increased. This tends to increase of the response of the vehicle to the operation of a steering wheel, so that the vehicle V becomes prone to oversteering, which can result in degraded maneuverability of the vehicle.

The present invention has been made to provide a solution to such a problem, and an object thereof is to provide an opening/closing control device for a shutter of a vehicle, which is capable of appropriately opening and closing the shutter according to the traveling conditions of the vehicle, to thereby make it possible to improve fuel economy while maintaining a good maneuverability of the vehicle.

Solution to Problem

To attain the above object, the present invention is directed toward an opening/closing control device 1 for a shutter of a vehicle, for controlling opening/closing of a shutter (grille shutter 47) that is openably and closably provided at a front part of a vehicle v and introduces ambient air into an engine room through a front opening (front grille 42 in embodiments (hereinafter, the same applies throughout this section)), comprising vehicle speed detection means (vehicle speed sensor 21) for detecting a speed of the vehicle V as a vehicle speed VP, first opening/closing control means (ECU 2, steps 3, 5, 6 in FIG. 4) for closing the shutter when the detected vehicle speed VP is not smaller than a predetermined first reference value VREF1 and smaller than a second reference value VREF2 which is larger than the first reference value VREF1, second opening/closing control means (ECU 2, steps 5, 8 in FIG. 4) for opening the shutter when the vehicle speed VP is not smaller than the second reference value VREF2, and opening condition-setting means (ECU 2, steps 2, 7 in FIG. 4) for setting a condition for opening the shutter by the second opening/closing control means according to at least one of a grip force FG of the vehicle V and a steering angle θSTR.

According to this opening/closing control device for a shutter of a vehicle, when the detected vehicle speed is not smaller than the predetermined first reference value and smaller than the second reference value which is larger than the first reference value, it is judged that the vehicle is in a high speed operating state, and the shutter is closed. With this, in the high speed operating state, by blocking ambient air from flowing into the engine room through the front opening, it is possible to reduce the air resistance and improve fuel economy. Further, when the detected vehicle speed is not smaller than the second reference value, it is judged that the vehicle is in an ultrahigh speed operating state, and the shutter is opened. With this, in the ultrahigh speed operating state, air introduced into the engine room disturbs air flowing along the vehicle body, whereby the pressure difference between the air flowing along the top of the vehicle body and the air flowing along the bottom of the vehicle body becomes small. As a result, a sinking amount of the front part of the vehicle body is reduced, which makes it possible to avoid oversteering incidental to an increase in the grip force and thereby improve the maneuverability of the vehicle.

Further, the maneuverability of the vehicle varies according to the grip force of the vehicle or the steering angle, even if the vehicle speed is the same. For this reason, by setting the condition for opening the shutter by the second opening/closing control means according to at least one of the grip force of the vehicle and the steering angle, when the vehicle is in the ultrahigh speed operating state, it is possible to open the shutter at appropriate timing according to the grip force of the vehicle and/or the steering angle.

The opening/closing control device further includes a grip force detection means (ECU 2, step 1 in FIG. 4) for detecting the grip force FG of the vehicle V, and wherein the opening condition-setting means sets the second reference value VREF2 to a larger value as the detected grip force FG is smaller (step 2 in FIG. 4, FIG. 5).

In the case where the vehicle speed is the same, as the grip force is smaller, adverse influence on the maneuverability of the vehicle is less. With this configuration, as the detected grip force is smaller, the second reference value is set to a larger value, and hence in the ultrahigh speed operating state, the vehicle speed at which the shutter is opened becomes larger. This makes it possible to appropriately broaden a speed region where the closed state of the shutter is maintained, according to an actual grip force, and further improve fuel economy. Note that, the term "to detect" in the present specification is used not only to mean "to directly measure with a sensor or the like" but also "to calculate or estimate according to an associated parameters and the like".

The opening/closing control device further includes steering angle detection means (steering sensor 22) for detecting the steering angle θSTR of the vehicle V, and wherein the opening condition-setting means inhibits the opening of the shutter when the detected steering angle θSTR is not larger than a predetermined value θREF (steps 6, 7 in FIG. 4).

Even if the grip force of the vehicle has increased in the ultrahigh speed operating state, when the steering angle of the vehicle is small, it has less influence on the maneuverability of the vehicle, and hence the necessity for opening the shutter is small. From this point of view, with the above configuration, the opening of the shutter is inhibited when the detected steering angle is not larger than the predetermined value, and accordingly, the closed state of the shutter is maintained for a longer time period, which makes it possible to further improve fuel economy.

In further accordance with the present invention, the shutter is formed such that an opening degree thereof is variable, the opening/closing control device further comprising sinking amount acquisition means (ECU 2, step 11 in FIG. 6) for acquiring a sinking amount AVBODY of the front part of the vehicle body B of the vehicle V, and opening degree-setting means (ECU 2, steps 12 to 15 in FIG. 6, FIGS. 8 to 10) for setting the opening degree (target shutter opening degree θSCMD) of the shutter to be opened by the second opening/closing control means according to the acquired sinking amount AVBODY of the vehicle body B.

With this configuration, the opening degree of the shutter is set according to the detected sinking amount of the vehicle body, it is possible to appropriately control the amount of introduction of ambient air into the engine room in a fine-grained manner according to the actual sinking amount of the vehicle body, and hence it is possible to achieve maneuverability of the vehicle and improvement of fuel economy in a well-balanced manner.

In further accordance with the present invention, the sinking amount acquisition means calculates the sinking amount AVBODY based on the vehicle speed VP (step 11 in FIG. 6, FIG. 7).

With this configuration, the sinking amount of the front part of the vehicle body is calculated based on the vehicle speed, and hence it is not necessary to separately provide a dedicated sensor for detecting a sinking amount, and it is possible to reduce the manufacturing costs.

The opening/closing control device further includes a grip force detection means (ECU 2, step 1 in FIG. 6) for detecting the grip force FG of the vehicle V, and wherein the opening degree-setting means sets the opening degree of the shutter to a larger value as the detected grip force FG is larger (steps 13, 15 in FIG. 6, FIG. 9).

With this configuration, as the detected grip force is larger, the opening degree of the shutter is set to a larger value, and hence by increasing the amount of introduction of ambient air into the engine room and reducing the air resistance and the sinking amount of the vehicle body, it is possible to appropriately control the grip force and further improve the maneuverability of the vehicle.

In further accordance with the present invention, an opening/closing control device 1 for a shutter of a vehicle, for controlling opening/closing of a shutter (grille shutter 47) that is openably and closably provided at a front part of a vehicle v and introduces ambient air into an engine room through a front opening (front grille 42 in embodiments (hereinafter, the same applies throughout this section)), comprising vehicle speed detection means (vehicle speed sensor 21) for detecting a speed of the vehicle V as a vehicle speed VP, shutter opening/closing means (ECU 2, step 27 in FIG. 11) for opening the shutter (step 4 in FIG. 11) when the detected vehicle speed VP is smaller than a predetermined first reference value VREF1 (step 3 in FIG. 11: NO), closing the shutter (step 6 in FIG. 11) when the vehicle speed VP is not smaller than the first reference value VREF1 and smaller than a second reference value VREF2 which is larger than the first reference value VREF1 (step 3 in FIG. 11: YES, step 5: NO), and opening the shutter when the vehicle speed VP is not smaller than the second reference value VREF2 (step 5 in FIG. 11: YES), and opening/closing speed-setting means (ECU 2, step 43 in FIG. 12) for setting a second opening/closing speed VS2 which is a shutter opening/closing speed when the vehicle speed VP has changed across the second reference value VREF2 (step 33 in FIG. 12: YES) to a smaller value than a first opening/closing speed VS1 which is a shutter opening/closing speed when the vehicle speed VP has changed across the first reference value VREF1 (step 31 in FIG. 12: YES).

According to this opening/closing control device for a shutter of a vehicle, when the detected vehicle speed is smaller than the predetermined first reference value, the shutter is opened. Further, when the vehicle speed is not smaller than the predetermined first reference value and smaller than the second reference value which is larger than the first reference value, it is judged that the vehicle speed is even higher, and the shutter is closed. Accordingly, by blocking ambient air from flowing into the engine room through the front grille, it is possible to reduce the air resistance and improve fuel economy. Further, when the vehicle speed is not smaller than the second reference value, it is judged that the vehicle speed is very high, and the shutter is opened. This causes the air introduced into the engine room to disturb airs flowing along the vehicle body, whereby the pressure difference between the air flowing along the top of the vehicle body and the air flowing along the bottom of the vehicle body becomes small. As a result, a sinking amount of the front part of the vehicle body is reduced, which makes it possible to avoid oversteering incidental to an increase in the grip force, and improve the maneuverability of the vehicle.

Further, the second opening/closing speed of the shutter employed when the vehicle speed has changed across the second reference value is set to a smaller value than the first opening/closing speed of the shutter employed when the vehicle speed has changed across the first reference value. The "opening/closing speed" of these first opening/closing speed and second opening/closing speed is an amount of change in the opening degree of the shutter per unit time. This makes it possible, when the vehicle speed is very high, to open and close the shutter more slowly, whereby it is possible to slowly change the sinking amount of the vehicle body and the grip force. As a result, it is possible to avoid oversteering and understeering incidental to an increase and a decrease in the grip force, and improve the maneuverability of the vehicle.

The opening/closing control device further includes a steering angle detection means (steering sensor 22) for detecting a steering angle θSTR of the vehicle V, and wherein the opening/closing speed-setting means corrects the second opening/closing speed VS2 according to the detected steering angle θSTR (steps 35, 43 in FIG. 12, FIG. 13).

In the case where the vehicle speed is the same, as the steering angle is larger, a steep change in the grip force has more influence on the maneuverability of the vehicle. With this configuration, the second opening/closing speed is corrected according to the detected steering angle, and hence, for example, by making the second opening/closing speed smaller as the steering angle is larger, it is possible to change the grip force more slowly, and further improve the maneuverability of the vehicle according to an actual steering angle.

The opening/closing control device further includes an opening inhibition means (ECU 2, step 6 in FIG. 11) for inhibiting the opening of the shutter when the vehicle speed VP is not smaller than the second reference value VREF2 and the steering angle θSTR is smaller than a predetermined value θREF (step 24 in FIG. 11: YES).

Even if the vehicle speed is very high and the grip force of the vehicle is large, when the steering angle of the vehicle is small, it has little influence on the maneuverability of the vehicle, and hence the necessity for opening the shutter is small. From this point of view, with the above-described configuration, the opening of the shutter is inhibited when the detected steering angle is smaller than the predetermined value, and accordingly, the closed state of the shutter can be maintained for a longer time period, whereby it is possible to further improve fuel economy.

The opening/closing control device further includes a steering angle change rate calculation means (ECU 2, step 39 in FIG. 12) for calculating a rate of change ΔθSTR of the steering angle, and wherein in a state in which the opening of the shutter is inhibited by the opening inhibition means, when the steering angle θSTR becomes not smaller than the predetermined value θREF (step 37 in FIG. 12: YES), the opening/closing speed-setting means corrects the second opening/closing speed VS2 according to the calculated rate of change ΔθSTR of the steering angle (steps 40, 43 in FIG. 12, FIG. 11).

The grip force is increased when the vehicle speed is high, and hence as the rate of change in the steering angle is larger, the vehicle is prone to oversteering. With this configuration, in a case where the opening of the shutter is inhibited in the state of the vehicle speed being very high, when the steering angle becomes not smaller than the predetermined value, the second opening/closing speed is corrected according to the rate of change of the steering angle. Therefore, for example, the second opening/closing speed is made larger as the rate of change of the steering angle is larger in the state of the vehicle speed being very high, whereby it is possible to avoid oversteering and further improve the maneuverability.

The opening/closing control device further includes grip force detection means (ECU 2, step 1 in FIG. 11) for detecting a grip force FG of the vehicle V, and wherein the opening/closing speed-setting means corrects the second opening/closing speed VS2 according to the detected grip force FG (steps 42, 43 in FIG. 12, FIG. 15).

When the vehicle speed is high, as the grip force of the vehicle is larger, the vehicle is prone to understeering when the shutter is opened. With this configuration, the second opening/closing speed is corrected according to the detected grip force, it is possible to appropriately avoid understeering according to an actual grip force and further improve the maneuverability of the vehicle.

The opening/closing control device further includes a prediction means (ECU 2) for predicting a change in the steering angle θSTR, and wherein in a state in which the opening of the shutter is inhibited by the opening inhibition means (step 24 in FIG. 16: YES), when the steering angle θSTR is predicted to change to not smaller than the predetermined value θREF (step 52 in FIG. 16: YES), the shutter opening/closing means opens the shutter before the steering angle θSTR changes (step 27 in FIG. 16).

With this configuration, in a case where the opening of the shutter is inhibited in the state of the vehicle speed being very high, when the steering angle is predicted to change to not smaller than the predetermined value, the shutter is opened in advance before the steering angle changes, and hence it is possible to avoid oversteering when the steering angle has changed and further improve the maneuverability.

MODE FOR CARRYING OUT INVENTION

Figure 1:
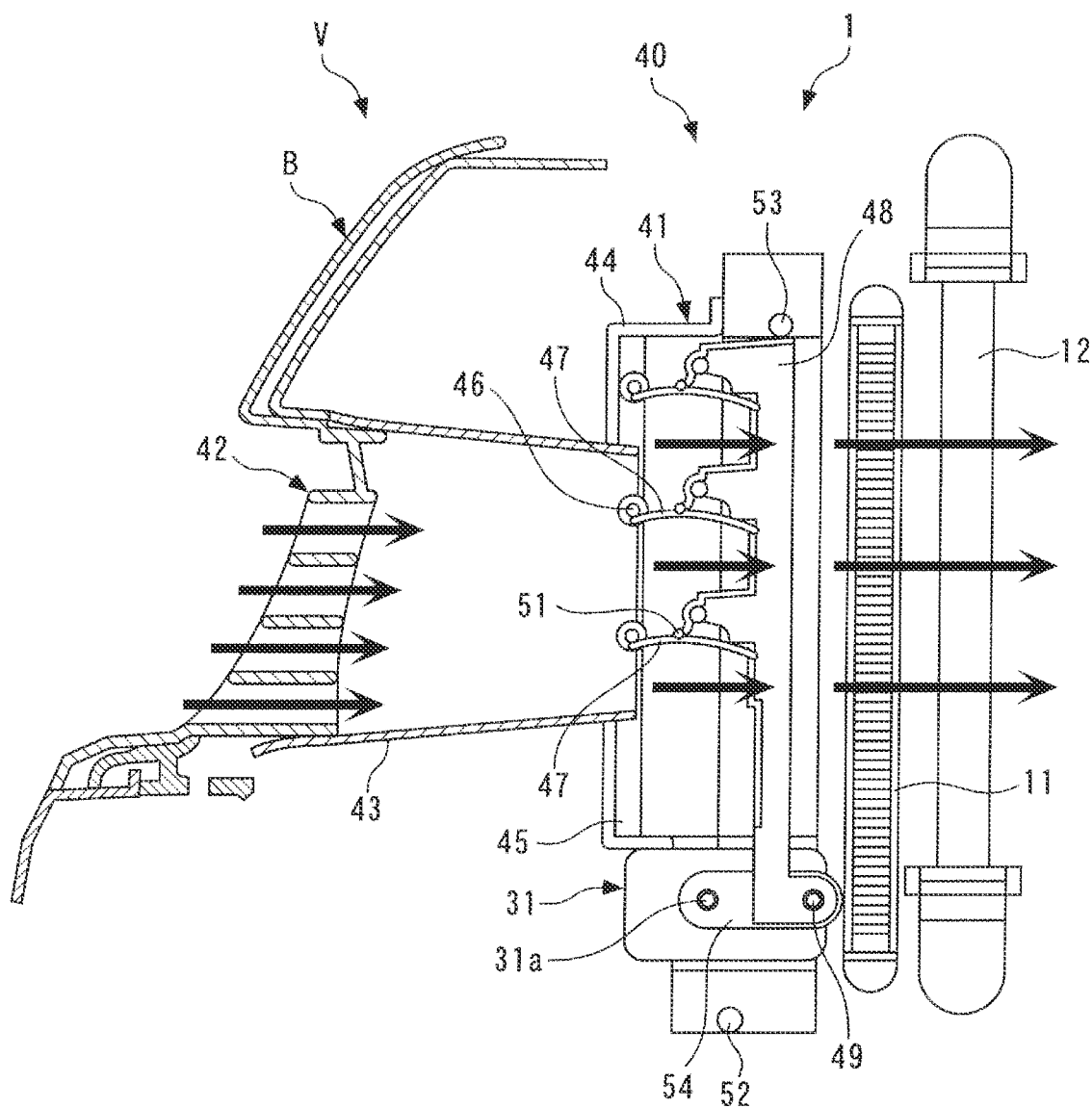
FIG. 1 A cross-sectional view of a ventilation device of a vehicle in a state in which a grille shutter is opened.

Hereafter, preferred embodiments of the present invention will be described with reference to drawings. As shown in FIG. 1, a vehicle V that mounts an opening/closing control device 1 to which is applied the present invention includes a ventilation device 40 at a front part of a vehicle body B thereof. The ventilation device 40 includes a front grille 42, a duct 43, a grille shutter mechanism 41, and a motor 31 in the mentioned order from the front side of the vehicle V (from the left side of the figure), and rearward of these, there are provided a condenser 11 and a radiator 12 of an air conditioner (not shown).

The grille shutter mechanism 41 includes a shutter base 44, a support member 45 which vertically extends within the shutter base 44, a plurality of horizontal shafts 46 which are supported by the support member 45, and a grille shutter 47 which is pivotally mounted on each shaft 46. Each grille shutter 47 is pivotally connected, via a joint 51, to a slide link 48 which vertically extends. The slide link 48 is urged upward by a spring (not shown), whereby, in normal times, an upper end of the slide link 48 is in abutment with an upper stopper 53 and the grille shutter 47 is held in a fully opened state shown in the same figure.

Further, the slide link 48 is connected, via a joint pin 49 and an arm link 54, to a rotating shaft 31a of the motor 31. The motor 31 is formed by a DC motor whose rotating shaft 31a rotates within a predetermined angle range. When, from the state shown in FIG. 1, the rotating shaft 31a rotates clockwise in the same figure, along with the pivotal movement of the arm link 54 performed in unison with the rotating shaft 31a, the slide link 48 is moved downward, whereby each grille shutter 47 is pivoted about the shaft 46 toward the closing side (clockwise).

Figure 2:
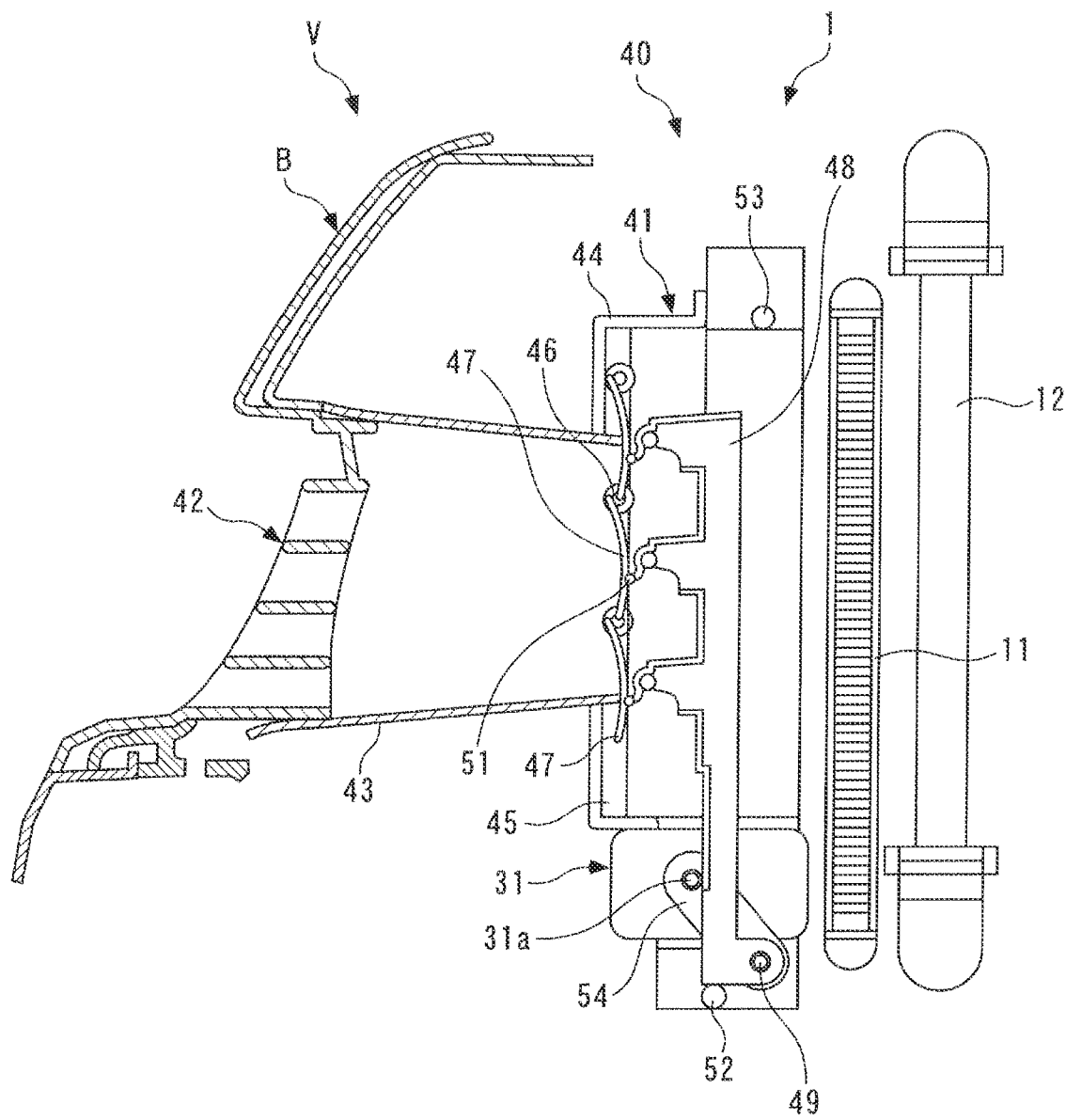
FIG. 2 A cross-sectional view of the ventilation device of the vehicle in a state in which the grille shutter is closed.

Therefore, according to an angle and a rotational speed of the rotating shaft 31a of the motor 31, it is possible to change an opening degree and an opening/closing speed (hereinafter referred to as "shutter opening/closing speed") VS of the grille shutter 47. For example, when the rotational angle of the rotating shaft 31a is the maximum, a lower end of the slide link 48 is in abutment with a lower stopper 52 and the grille shutter 47 is in a fully closed state shown in FIG. 2.

When the grille shutter 47 is in an open state as shown in FIG. 1, ambient air flowing into the vehicle V through the front grille 42 during traveling thereof is guided by the duct 43 to pass through the condenser 11, the radiator 12, and an engine room (not shown), and then, it flows downward, and is vented out to the atmosphere. While ambient air thus passes through the condenser 11 and the radiator 12, heat is removed from refrigerant flowing in the condenser 11 and cooling water flowing in the radiator 12, whereby the cooling water is cooled.

Figure 3:
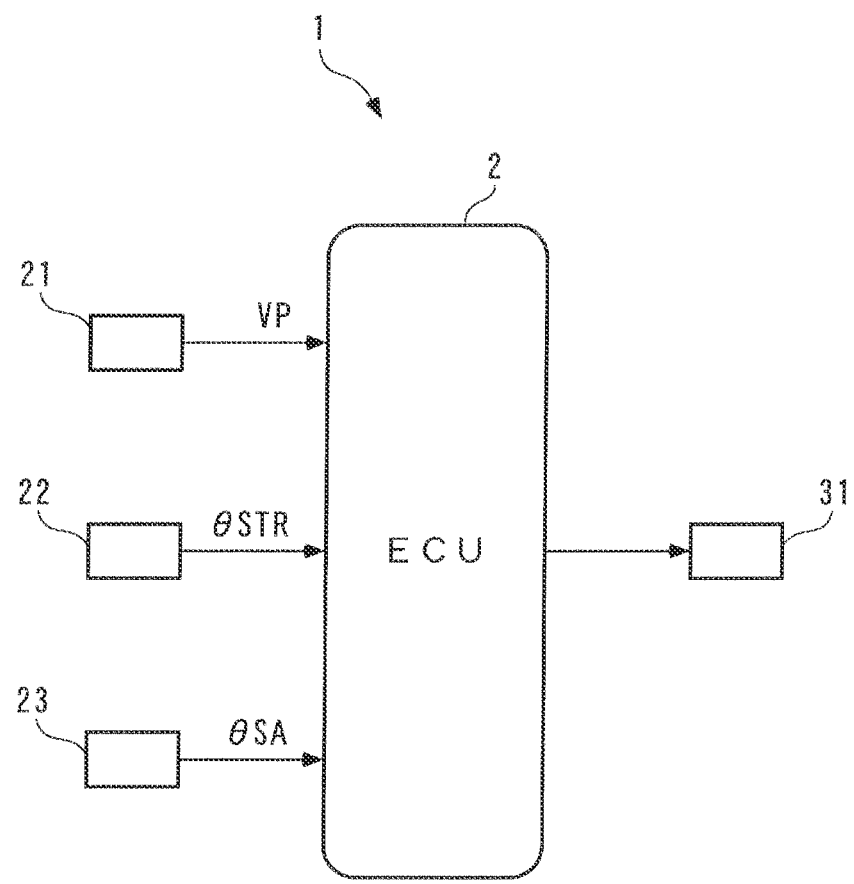
FIG. 3 A block diagram showing an opening/closing control device for the grille shutter.

As shown in FIG. 3, a detection signal indicative of a vehicle speed VP which is the traveling speed of the vehicle V is delivered from a vehicle speed sensor 21 to an ECU 2, and a steering sensor 22 and a shutter opening degree sensor 23 are connected to the ECU 2. The steering sensor 22 is provided on a front wheel (not shown) of the vehicle V, and detects an angle of the front wheel as a steering angle θSTR and delivers a detection signal indicative thereof to the ECU 2. Further, the shutter opening degree sensor 23 is provided on the rotating shaft 31a of the motor 31, and detects an angle of the rotating shaft 31a as an opening degree (hereinafter referred to as "shutter opening degree") θSA of the grille shutter 47 and delivers a detection signal indicative thereof to the ECU 2.

The ECU 2 is implemented by a microcomputer comprising a CPU, a RAM, a ROM, and an I/O interface (none of which are shown). The ECU 2 executes various processing operations based on control programs stored in the ROM, etc., according to detection signals from the above-mentioned sensors 21 to 23. In the embodiments, the ECU 2 corresponds to first opening/closing control means, second opening/closing control means, opening condition-setting means, grip force detection means, sinking amount detection means, opening degree-setting means, shutter opening/closing means, opening/closing speed-setting means, opening inhibition means, steering angle change rate calculation means, and prediction means.

Next, an opening/closing control process for the grille shutter 47 according to a first embodiment of the present invention executed by the ECU 2 will be described with reference to FIGS. 4 to 10. The opening/closing control process controls the opening/closing of the grille shutter 47, according to the traveling conditions of the vehicle V, and is executed at intervals of a predetermined time period.

Figure 4:
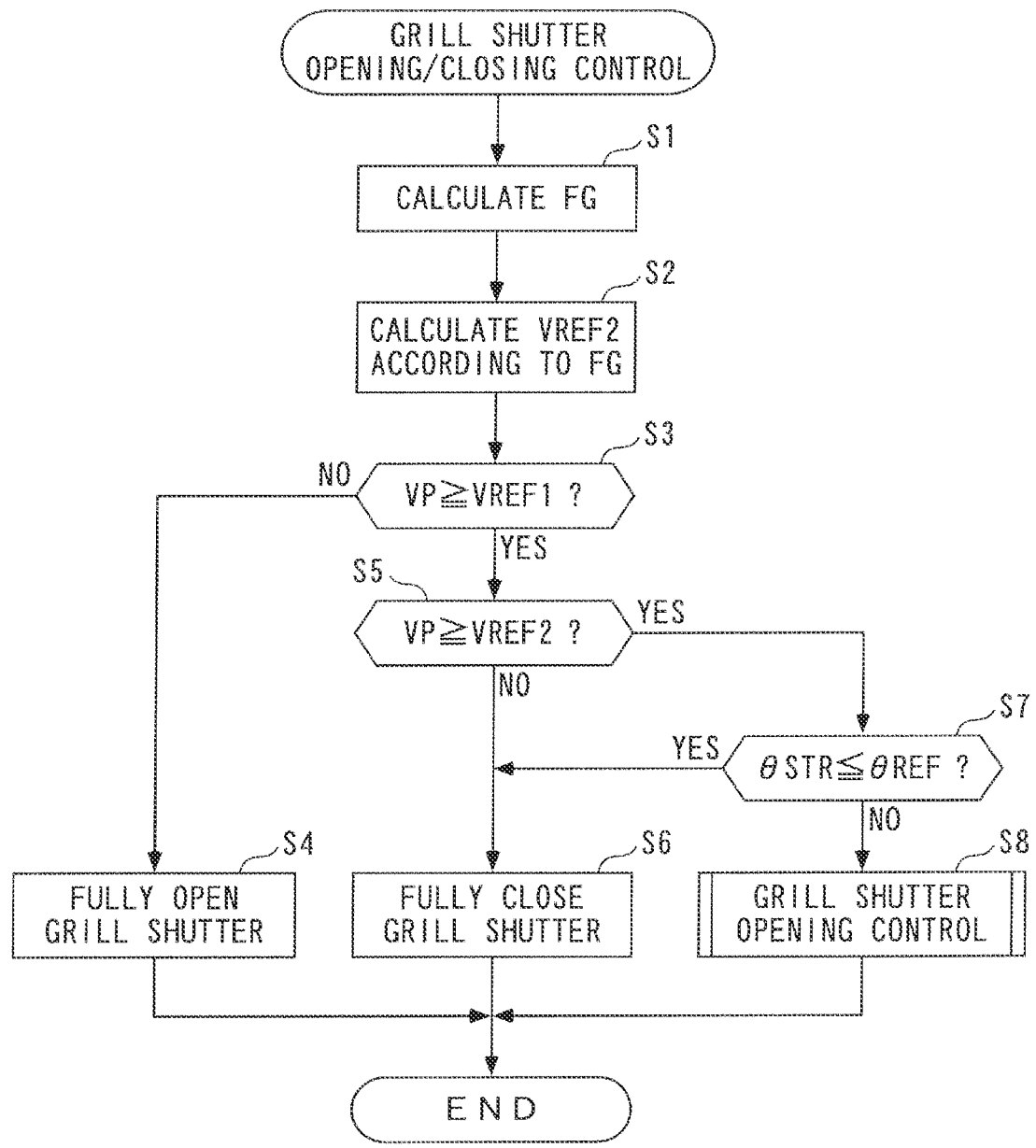
FIG. 4 A flowchart showing a main routine of an opening/closing control process for the grille shutter according to a first embodiment.

In the main routine shown in FIG. 4, first, in a step 1 (denoted as "S1" in FIG. 4; steps mentioned hereinafter are also denoted in the same manner), a grip force FG of the vehicle V is calculated. The grip force FG is calculated based on the vehicle speed VP, a slope of a traveling road surface, conditions of the traveling road surface, and air pressures of tires (not shown), etc. Of these parameters, the slope of the traveling road surface is calculated based on the difference between an actual acceleration of the vehicle V and a predetermined reference acceleration. The conditions of the traveling road surface are determined according to a coefficient of friction μ of the traveling road surface calculated based on wheel seeds, the vehicle speed VP, an accelerator opening degree, and the slope of the traveling road surface, etc. Further, the air pressures of the tires are detected by air pressure sensors (not shown).

Figure 5:
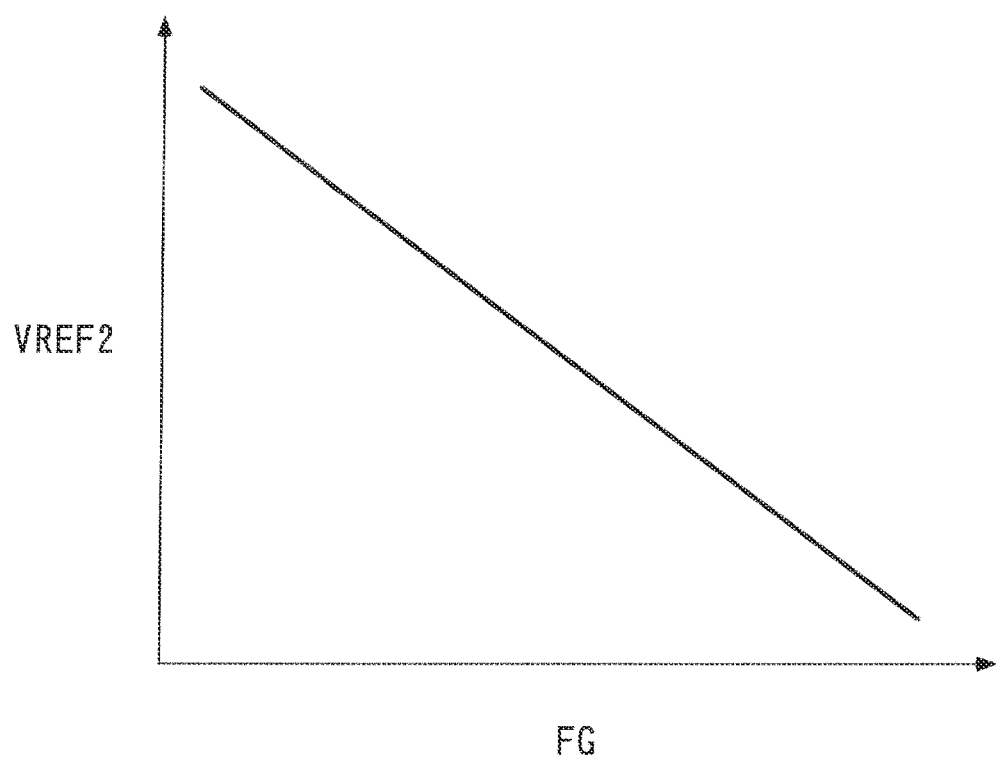
FIG. 5 A map for calculating a second reference value.

Next, in a step 2, a second reference value VREF2 is calculated by searching a map shown in FIG. 5 according to the calculated grip force FG. In this map, the second reference value VREF2 is set to a larger value than a predetermined first reference value VREF1, referred to hereinafter, and is set to a larger value as the grip force FG is smaller.

Next, it is determined in a step 3 whether or not the vehicle speed VP is not smaller than the predetermined first reference value VREF1 (e.g. 30 km/h). If the answer to this question is NO, it is judged that the vehicle V is in a low or middle speed operating state, so that the motor 31 is stopped to control the grille shutter 47 to the fully opened state (step 4), followed by terminating the present process. This is because the air resistance acting on the vehicle V is inherently small in the low or middle speed operating state, and hence even if the grille shutter 47 is closed to reduce the air resistance, the effect of improving fuel economy is small, and is further for the purpose of saving electrical power consumption of the motor 31 used for closing the grille shutter 47 which is of a normally open type.

On the other hand, if the answer to the question of the step 3 is YES, it is determined in a step 5 whether or not the vehicle speed VP is not smaller than the second reference value VREF2 calculated in the step 2. If the answer to this question is NO, which means that VREF1≤VP<VREF2 holds, it is judged that the vehicle V is in a high speed operating state, and in order to reduce the air resistance and improve fuel economy, the motor 31 is driven to control the grille shutter 47 to the fully closed state (step 6), followed by terminating the present process.

On the other hand, if the answer to the question of the step 5 is YES, which means that VP≥VREF2 holds, it is judged that the vehicle V is in a ultrahigh speed operating state, and it is determined whether or not the steering angle θSTR is not larger than a predetermined value θREF (e.g. 10°) (step 7). If the answer to this question is NO, which means that θSTR>θREF holds, it determined that the grille shutter 47 is to be opened in order to ensure maneuverability of the vehicle V, so that an opening control process for the grille shutter 47 is executed (step 8), followed by terminating the present process.

On the other hand, if the answer to the question of the step 7 is YES, which means that θSTR≤θREF holds, it is determined that the opening of the grille shutter 47 is to be inhibited since the steering angle θSTR is small and has little influence on the maneuverability of the vehicle V, so that the process proceeds to the above-mentioned step 6 to thereby control the grille shutter 47 to the fully closed state.

Figure 6:
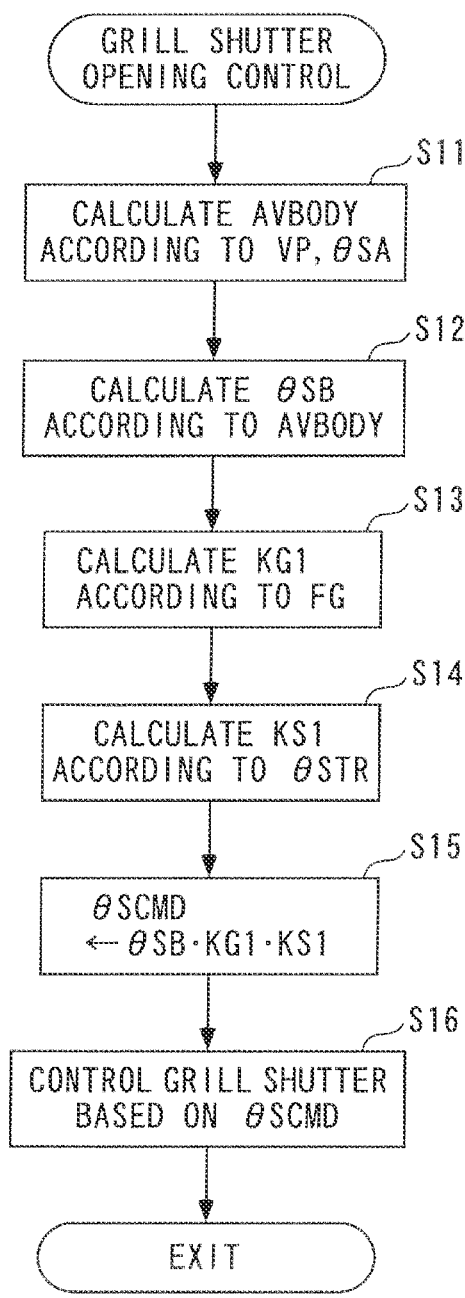
FIG. 6 A flowchart showing an opening control process for the grille shutter.
Figure 7:
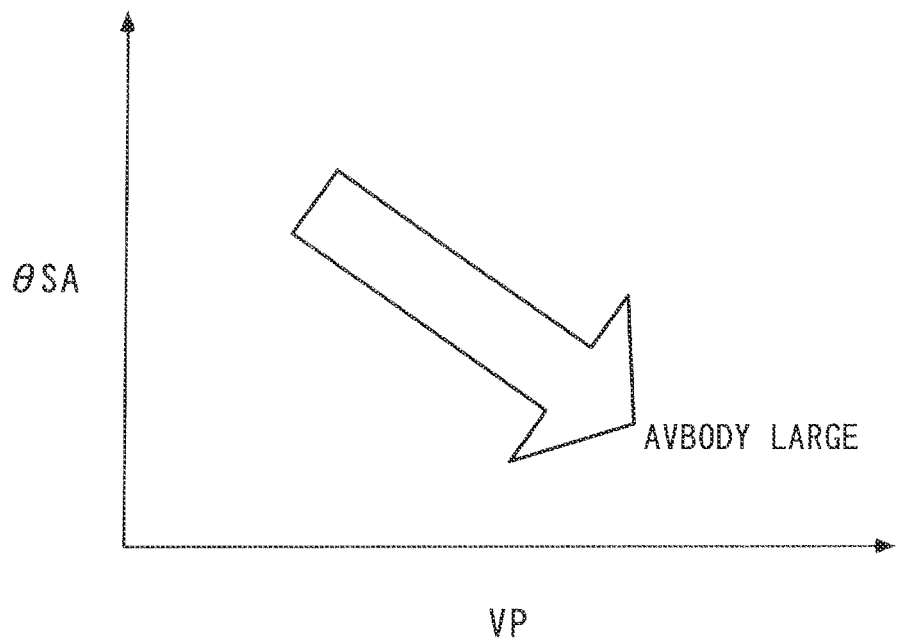
FIG. 7 A map for calculating a sinking amount of a front part of a vehicle body.

FIG. 6 shows a subroutine of the opening control process executed in the above-mentioned step 8. In the present process, first, in a step 11, a sinking amount AVBODY of a front part of the vehicle body B is calculated by searching a map shown in FIG. 7 according to the vehicle speed VP and the shutter opening degree θSA. In this map, the sinking amount AVBODY is set to a larger value as the vehicle speed VP is larger and the shutter opening degree θSA is smaller.

Figure 8:
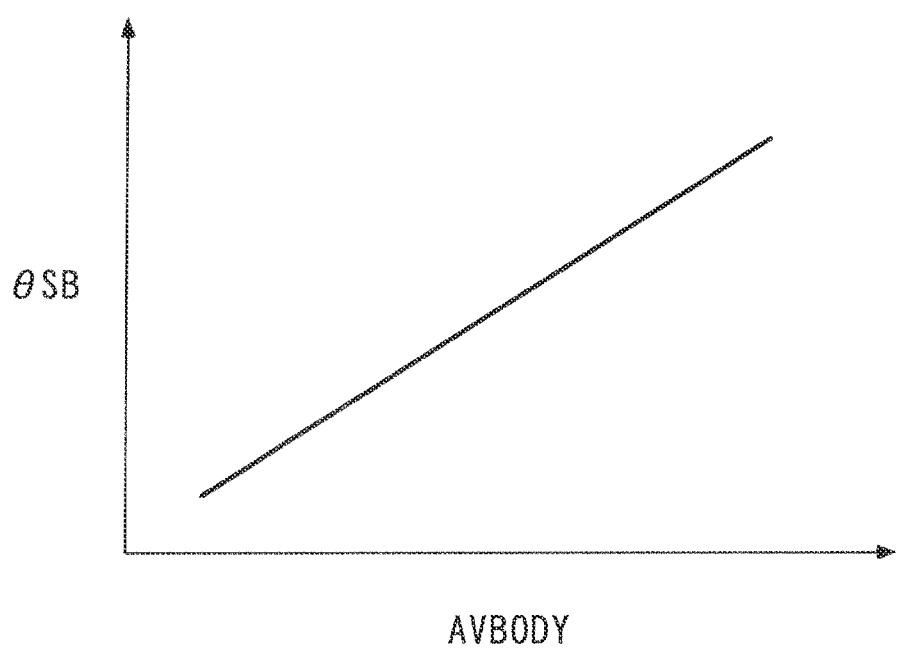
FIG. 8 A map for calculating a basic value of a target shutter opening degree.

Next, in a step 12, a basic value θSB of a target shutter opening degree θSCMD is calculated by searching a map shown in FIG. 8 according to the calculated sinking amount AVBODY. In this map, the basic value θSB is set to a larger value as the sinking amount AVBODY is larger, in order to further reduce the air resistance.

Figure 9:
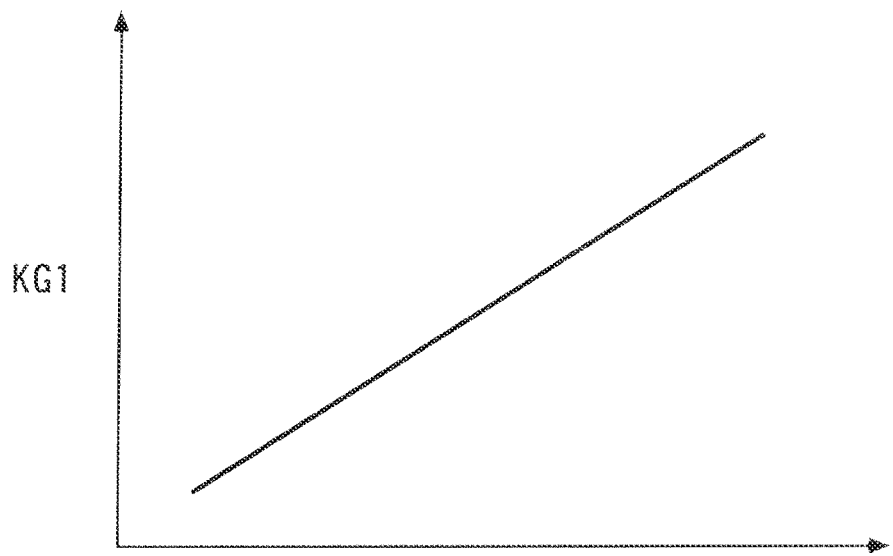
FIG. 9 A map for calculating a first grip force-dependent correction coefficient.

Next, in a step 13, a first grip force-dependent correction coefficient KG1 is calculated by searching a map shown in FIG. 9 according to the grip force FG. In this map, the first grip force-dependent correction coefficient KG1 is set to a larger value as the grip force FG is larger, in order to further reduce the air resistance.

Figure 10:
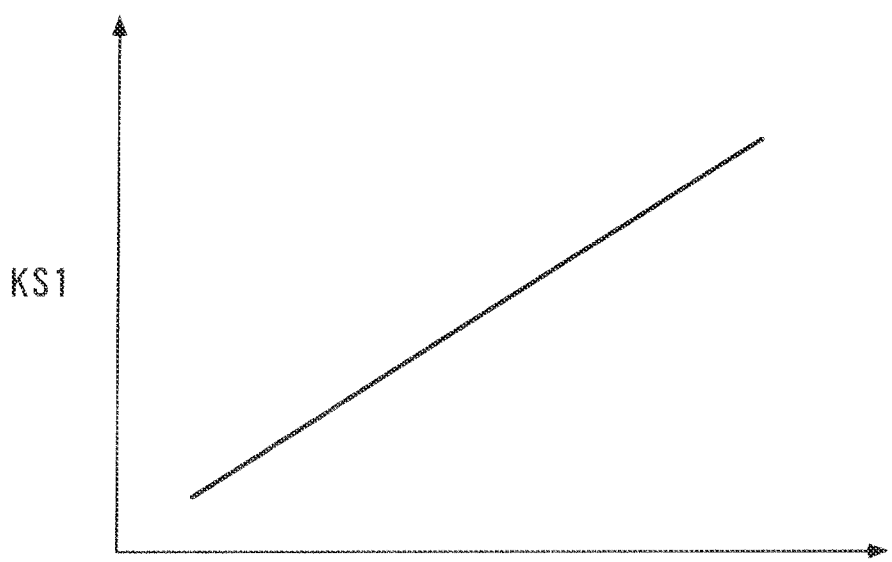
FIG. 10 A map for calculating a first steering angle-dependent correction coefficient.

Next, in a step 14, a first steering angle-dependent correction coefficient KS1 is calculated by searching a map shown in FIG. 10 according to the steering angle θSTR. In this map, the first steering angle-dependent correction coefficient KS1 is set to a smaller value as the steering angle θSTR is smaller, since as the steering angle θSTR is smaller, it has less influence on the maneuverability of the vehicle V.

Next, in a step 15, the target shutter opening degree θSCMD is calculated by multiplying the basic value θSB by the first grip force-dependent correction coefficient KG1 and the first steering angle-dependent correction coefficient KS1. Next, in a step 16, the opening degree of the grille shutter 47 is controlled to the target shutter opening degree θSCMD by driving the motor 31 based on the target shutter opening degree θSCMD, followed by terminating the present process.

As described above, according to the present embodiment, the grille shutter 47 is closed when the vehicle speed VP is not smaller than the predetermined first reference value VREF1 and smaller than the second reference value VREF2, and hence in the high speed operating state, by blocking ambient air from flowing into the engine room through the front grille 42, it is possible to reduce the air resistance acting on the vehicle V and thereby improve fuel economy. Further, the grille shutter 47 is opened when the vehicle speed VP is not smaller than the second reference value VREF2, and hence in the ultrahigh speed operating state, the sinking amount AVBODY is reduced by ambient air introduced into the engine room, whereby it is possible to avoid oversteering incidental to an increase of the grip force FG, and to improve the maneuverability of the vehicle V.

Further, the second reference value VREF2 is set to a larger value as the grip force FG is smaller, and hence in the ultrahigh speed operating state, it is possible to appropriately expand a speed region for maintaining the closed state of the grille shutter 47, according to an actual grip force FG of the vehicle V, and further improve fuel economy.

Further, even in the ultrahigh speed operating state, when the steering angle θSTR is not larger than the predetermined value θREF, the opening of the grille shutter 47 is inhibited, and hence, accordingly, the closed state of the grille shutter 47 is maintained for a longer time period, which makes it possible to further improve fuel economy. Further, the sinking amount AVBODY is calculated based on the vehicle speed VP, and hence it is unnecessary to separately provide a dedicated sensor for detecting the sinking amount AVBODY, which makes it possible to reduce the manufacturing costs.

Further, since the target shutter opening degree θSCMD of the grille shutter 47 is set according to the sinking amount AVBODY, it is possible to appropriately control the amount of introduction of ambient air into the engine room in a fine-grained manner according to the actual sinking amount AVBODY, and accordingly it is possible to achieve maneuverability of the vehicle V and improvement of fuel economy in a well-balanced manner.

Further, the first grip force-dependent correction coefficient KG1 is set to a larger value as the grip force FG is larger, and hence by increasing the amount of introduction of ambient air into the engine room and reducing the air resistance and the sinking amount AVBODY, it is possible to appropriately control the grip force FG and further improve the maneuverability of the vehicle V.

Next, an opening/closing control process for the grille shutter 47 according to a second embodiment of the present invention will be described with reference to FIGS. 11 to 15. The present process is executed at intervals of a predetermined time period. As is distinct from the first embodiment described above in which the opening/closing control process controls the opening/closing of the grille shutter 47 according to the vehicle speed VP, the present process controls, in addition to that, the shutter opening/closing speed VS.

Figure 11:
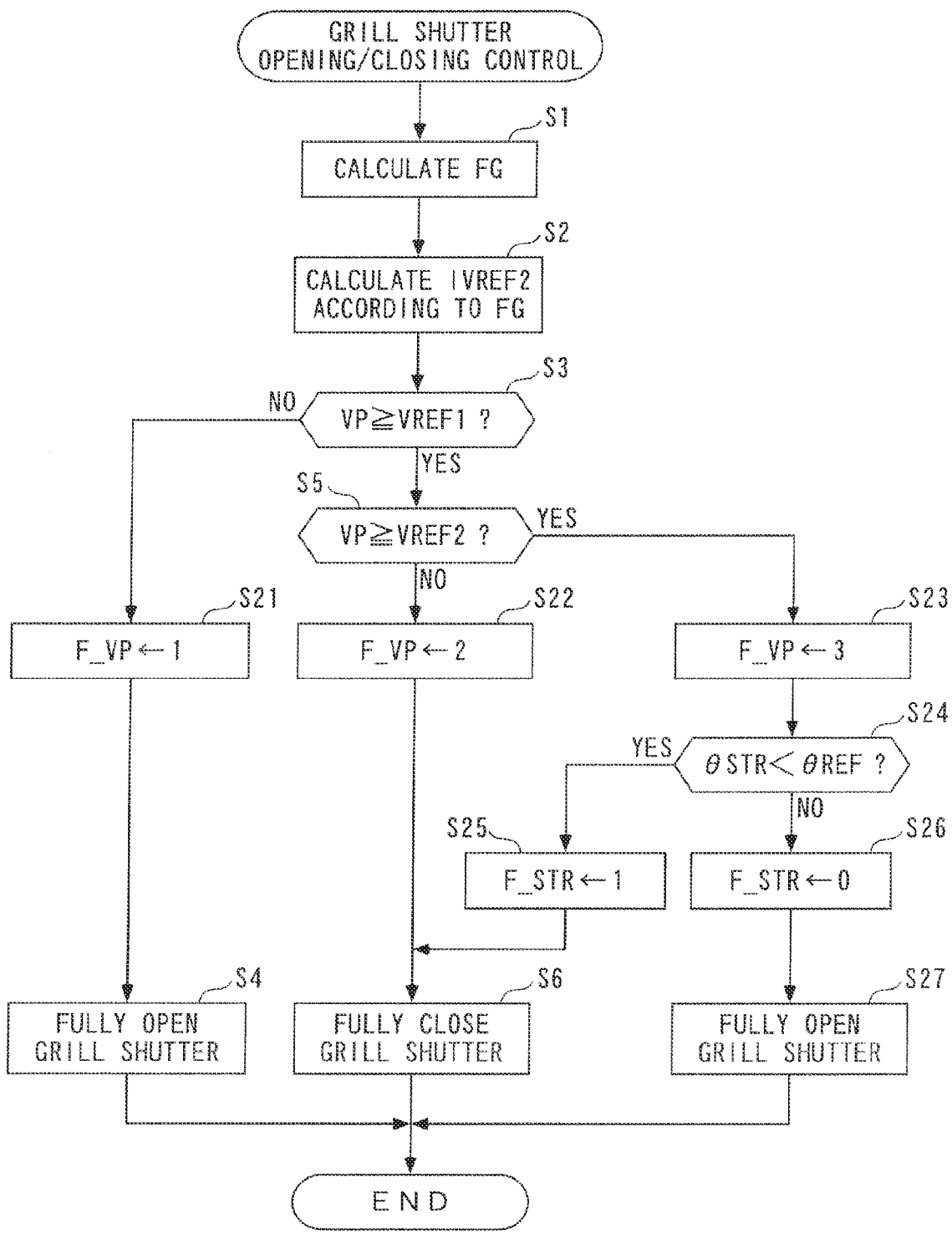
FIG. 11 A flowchart showing an opening/closing control process for a grille shutter according to a second embodiment.

Note that, in FIG. 11, steps which are identical in execution details of corresponding steps of the opening/closing control process in FIG. 4 are denoted by the same step numbers. In the present process, first, the steps 1 to 3 are executed, similarly to the opening/closing control process in FIG. 4. If the answer to the question of the step 3 is NO, which means that the vehicle speed VP is smaller than the first reference value VREF1, it is judged that the vehicle V is in the low or middle speed operating state, and to indicate this, a vehicle speed flag F_VP is set to "1" (step 21), and the grille shutter 47 is controlled to the fully opened state (step 4), followed by terminating the present process.

On the other hand, if the answer to the question of the step 3 is YES, it is determined in a step 5 whether or not the vehicle speed VP is not smaller than the second reference value VREF2. If the answer to this question is NO, which means that VREF1≤VP<VREF2 holds, it is judged that the vehicle V is in the high speed operating state, and to indicate this, the vehicle speed flag F_VP is set to "2" (step 22), and the grille shutter 47 is controlled to the fully closed state (step 6), followed by terminating the present process.

On the other hand, if the answer to the question of the step 5 is YES, which means that VP≥VREF2 holds, it is judged that the vehicle V is in the ultrahigh speed operating state, and to indicate this, the vehicle speed flag F_VP is set to "3" (step 23). Next, it is determined whether or not the steering angle θSTR is smaller than the predetermined value θREF (step 24). When the answer to this question is YES, the steering angle θSTR is relatively small and has little influence on the maneuverability of the vehicle V, and hence it is determined that the opening of the grille shutter 47 is to be inhibited, and to indicate this, an opening inhibition flag F_STR is set to "1" (step 25). Next, the process proceeds to the above-mentioned step 6 to thereby control the grille shutter 47 to the fully closed state.

On the other hand, if the answer to the question of the step 24 is NO, which means that θSTR≥θREF holds, it is determined that the grille shutter 47 is to be opened in order to ensure the maneuverability of the vehicle V in the ultrahigh speed operating state, and to indicate this, the opening inhibition flag F_STR is set to "0" (step 26). Next, the grille shutter 47 is controlled to the fully opened state (step 27), followed by terminating the present process.

Figure 12:
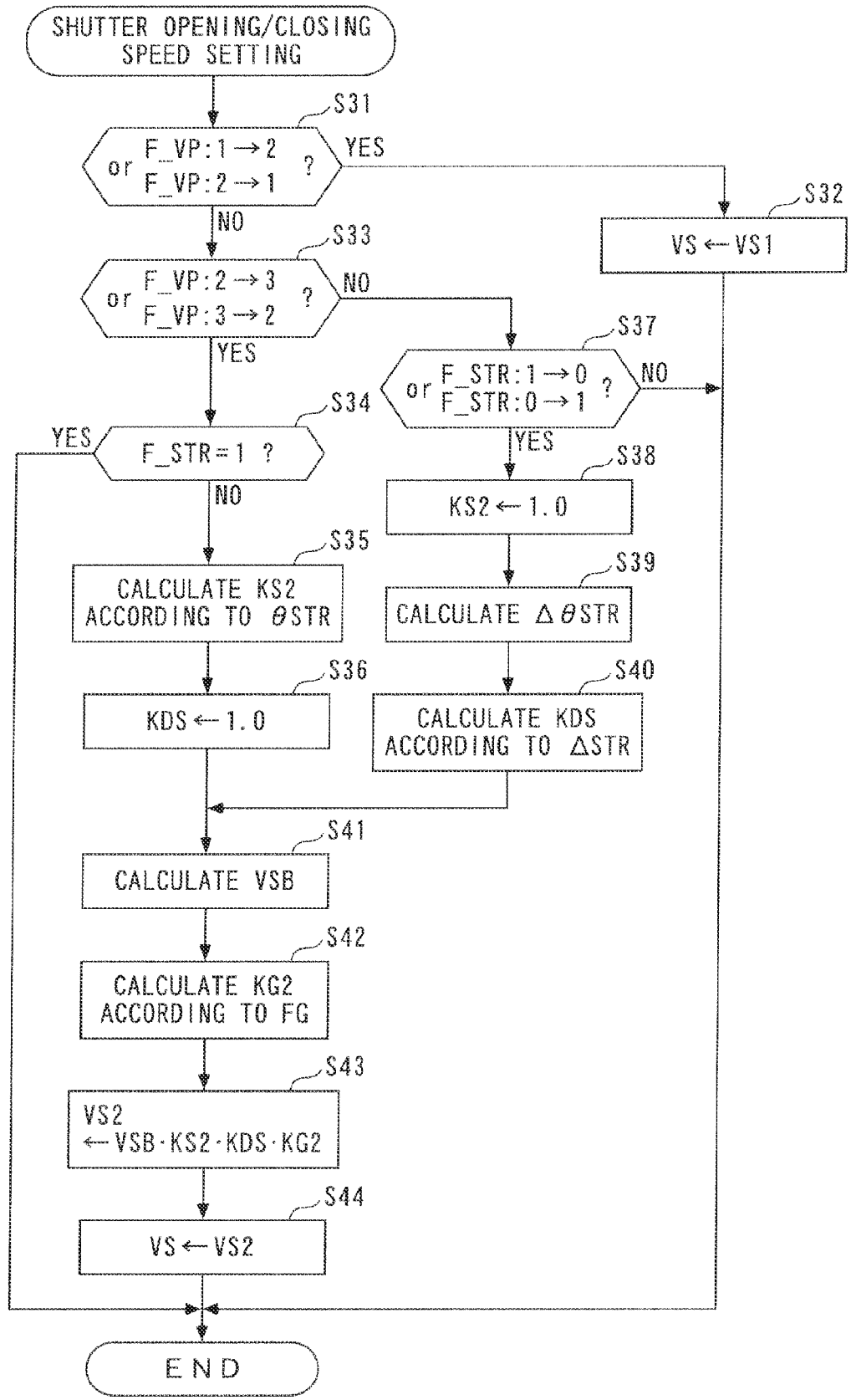
FIG. 12 A flowchart showing a setting process for a shutter opening/closing speed.

FIG. 12 shows a setting process for the shutter opening/closing speed VS. The present process sets the shutter opening/closing speed VS when the grille shutter 47 is switched by the opening/closing control process in FIG. 11 from the fully opened state to the fully closed state or from the fully closed state to the fully opened state.

In the present process, first, it is determined in a step 31 whether or not the vehicle speed flag F_VP has been changed from "1" to "2" or from "2" to "1". If the answer to this question is YES, which means that the vehicle speed VP has been changed across the first reference value VREF1, the shutter opening/closing speed VS is set to a predetermined first opening/closing speed VS1 (step 32), followed by terminating the present process.

On the other hand, if the answer to the question of the step 31 is NO, which means that the vehicle speed VP has not been changed across the first reference value VREF1, it is determined in a step 33 whether or not the vehicle speed flag F_VP has been changed from "2" to "3" or from "3" to "2". If the answer to this question is YES, which means that the vehicle speed VP has not been changed across the second reference value VREF2, it is determined whether or not the opening inhibition flag F_STR is "1" (step 34).

If the answer to the question of the step 34 is YES, i.e. if the steering angle θSTR is smaller than the predetermined value θREF when the vehicle speed VP is not smaller than the second reference value VREF2 (step 24: YES), to cause opening of the grille shutter 47 to be inhibited and maintaining of the grille shutter 47 in the closed state to be continued, the present process is terminated without setting the shutter opening/closing speed VS.

Figure 13:
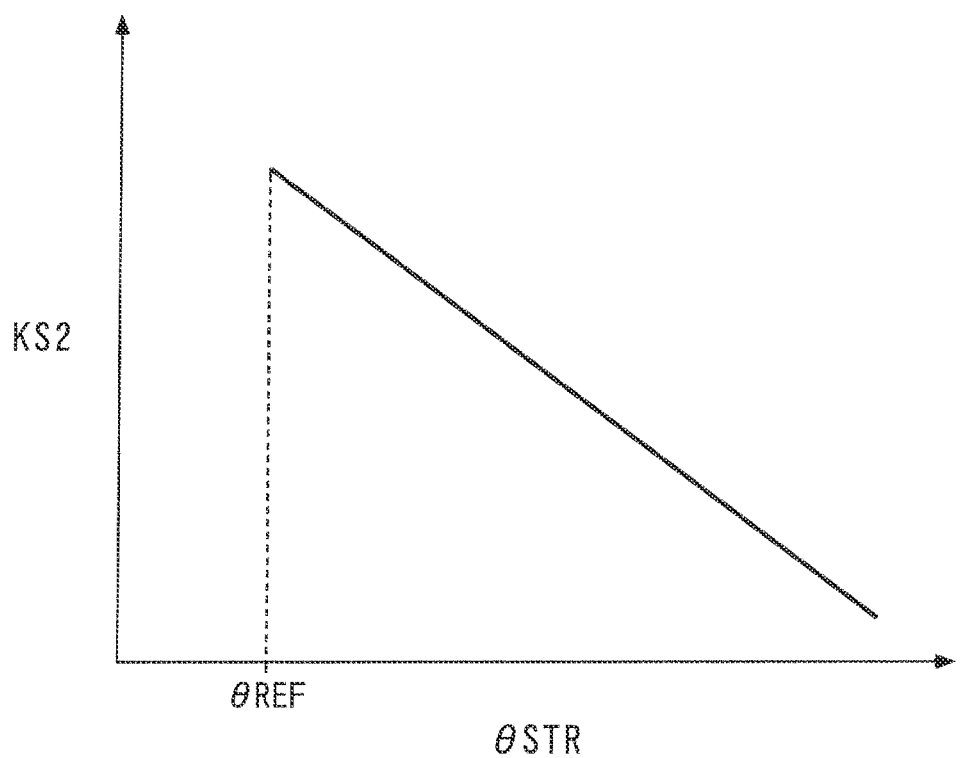
FIG. 13 A map for calculating a second steering angle-dependent correction coefficient.

On the other hand, if the answer to the question of the step 34 is NO, i.e. if the opening of the grille shutter 47 is not inhibited when the vehicle speed VP is not smaller than the second reference value VREF2, causing the grille shutter 47 to be switched between the fully opened state and the fully closed state in accordance of changing of the vehicle speed VP across the second reference value VREF2, in a step 35, a second steering angle-dependent correction coefficient KS2 is calculated by searching a map shown in FIG. 13 according to the steering angle θSTR. In this map, the second steering angle-dependent correction coefficient KS2 is set to a smaller value as the steering angle θSTR is larger, since as the steering angle θSTR is larger, it has more influence on the maneuverability of the vehicle V. Next, in a step 36, a steering angle change rate-dependent correction coefficient KDS is set to a value of 0.1, and the process proceeds to a step 41, described hereinafter.

On the other hand, if the answer to the question of the step 33 is NO, which means that the vehicle speed VP has not changed across the second reference value VREF2, it is determined whether or not the opening inhibition flag F_STR has been changed from "1" to "0" or from "0" to "1" (step 37). If the answer to this question is NO, the present process is immediately terminated.

On the other hand, if the answer to the question of the step 37 is YES, i.e. if, in the state in which the vehicle speed VP is not smaller than the second reference value VREF2 and the steering angle θSTR has changed from smaller than the predetermined value θREF to not smaller than the predetermined value θREF or vice versa, the second steering angle-dependent correction coefficient KS2 is set to a value of 1.0 (step 38).

Next, in a step 39, a steering angle change rate ΔθSTR is calculated. The steering angle change rate ΔθSTR is calculated by subtracting the immediately preceding value θSTR (n−1) from the present value θSTR(n) (ΔθSTR=θSTR(n)−θSTR(n−1)).

Figure 14:
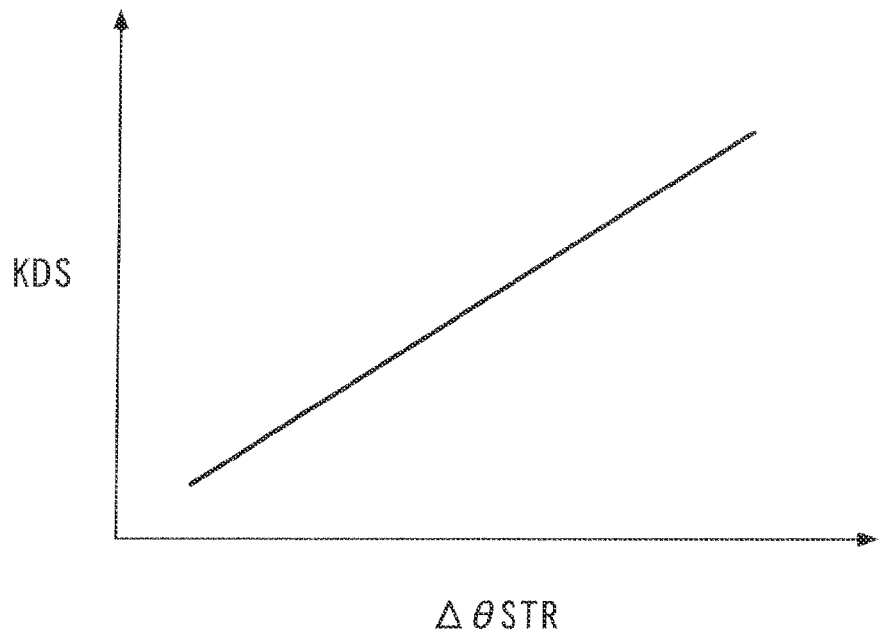
FIG. 14 A map for calculating a steering angle change rate-dependent correction coefficient.

Next, in a step 40, the steering angle change rate-dependent correction coefficient KDS is calculated by searching a map shown in FIG. 14 according to the calculated steering angle change rate ΔθSTR. In this map, the steering angle change rate-dependent correction coefficient KDS is set to a larger value as the steering angle change rate ΔθSTR is larger, because as the steering angle change rate ΔθSTR is larger, the vehicle V becomes prone to oversteering.

In the step 41 following the above-mentioned step 36 or 40, a basic value VSB of the shutter opening/closing speed VS is calculated. The basic value VSB is calculated, for example, according to the vehicle speed VP.

Figure 15:
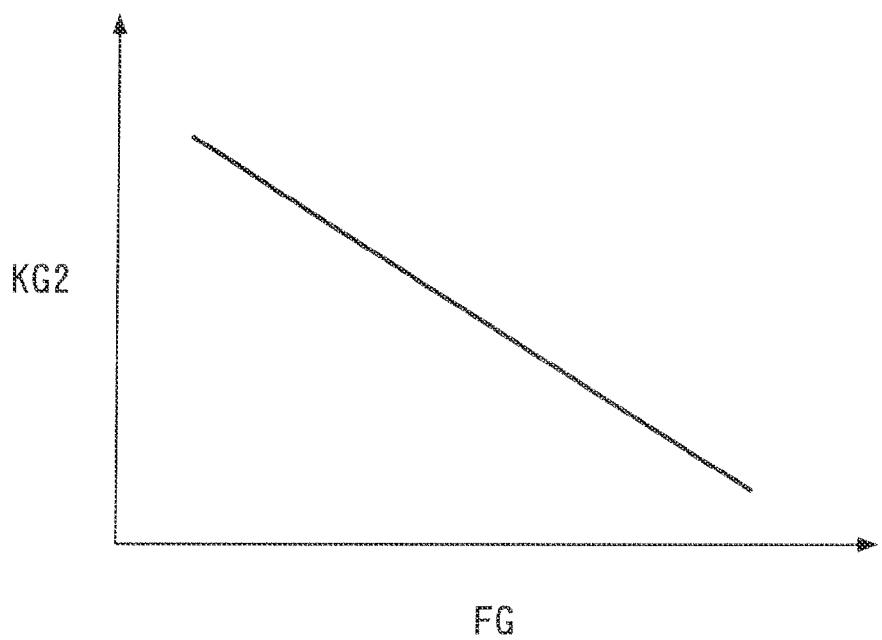
FIG. 15 A map for calculating a second grip force-dependent correction coefficient.

Next, in a step 42, a second grip force-dependent correction coefficient KG2 is calculated by searching a map shown in FIG. 15 according to the grip force FG. In this map, the second grip force-dependent correction coefficient KG2 is set to a smaller value as the grip force FG is larger, because as the grip force FG is larger, the vehicle V becomes prone to oversteering.

Next, in a step 43, a second opening/closing speed VS2 is calculated by multiplying the basic value VSB by the second steering angle-dependent correction coefficient KS2, the steering angle change rate-dependent correction coefficient KDS, and the second grip force-dependent correction coefficient KG2. The second opening/closing speed VS2 thus calculated has a relationship with the above-mentioned first opening/closing speed VS1 in which the former is smaller than the latter, and the above-mentioned basic value VSB, second steering angle-dependent correction coefficient KS2, and so forth are set such that they satisfy this relationship. Next, the second opening/closing speed VS2 is set as the shutter opening/closing speed VS (step 44), followed by terminating the present process.

As described above, according to the present embodiment, when the vehicle speed VP is smaller than the first reference value VREF1, the grille shutter 47 is opened. In the low or middle speed operating state, the air resistance acting on the vehicle V is inherently small, and hence the effect of improving fuel economy by closing the grille shutter 47 is small. Therefore, the grille shutter 47 is opened and the motor 31 is stopped, as described above, whereby electrical power consumption of the motor 31 can be saved.

Further, the grille shutter 47 is closed when the vehicle speed VP is not smaller than the first reference value VREF1 and smaller than the second reference value VREF2, and hence in the high speed operating state, by blocking ambient air from flowing into the engine room through the front grille 42, it is possible to reduce the air resistance and improve fuel economy.

Further, the grille shutter 47 is opened when the vehicle speed VP is not smaller than the second reference value VREF2, and hence in the ultrahigh speed operating state, the sinking amount of the vehicle body B is reduced by ambient air introduced into the engine room, whereby it is possible to avoid oversteering incidental to the increase of the grip force FG, and thereby improve the maneuverability of the vehicle V.

Further, the second opening/closing speed VS2 of the grille shutter 47 employed when the vehicle speed VP changes across the second reference value VREF2 is set to a smaller value than the first opening/closing speed VS1 employed when the vehicle speed VP changes across the first reference value VREF1, and hence when the vehicle speed VP is very high, the grille shutter 47 is more slowly opened and closed, whereby it is possible to slowly change the sinking amount and the grip force FG. As a result, it is possible to avoid oversteering or understeering incidental to the increase or decrease of the grip force FG, and thereby improve the maneuverability of the vehicle V.

Further, as the detected steering angle θSTR is larger, the second steering angle-dependent correction coefficient KS2 is set to a smaller value whereby the second opening/closing speed VS2 is corrected to a reduced side. This makes it possible to change the grip force FG more slowly and further improve the maneuverability of the vehicle V according to an actual steering angle θSTR. Further, the opening of the grille shutter 47 is inhibited when the vehicle speed VP is not smaller than the second reference value VREF2 and the steering angle θSTR is smaller than the predetermined value θREF, and hence even in the ultrahigh speed operating state, when the steering angle θSTR is small and has little influence on the maneuverability of the vehicle V, the closed state of the grille shutter 47 is maintained for a longer time period, whereby it is possible to further improve fuel economy.

Further, when opening the grille shutter 47 according to the steering angle θSTR becoming not smaller than the predetermined value θREF in the above-described state in which the opening of the grille shutter 47 is inhibited, the steering angle change rate-dependent correction coefficient KDS is set to a larger value as the steering angle change rate ΔθSTR is larger to thereby correct the second opening/closing speed VS2 to an increased side. This makes it possible to avoid oversteering in the ultrahigh speed operating state and further improve the maneuverability.

Further, as the detected grip force FG is larger, the second grip force-dependent correction coefficient KG2 is set to a smaller value to thereby correct the second opening/closing speed VS2 to a reduced side. This makes it possible to appropriately avoid understeering according to the actual grip force FG and further improve the maneuverability of the vehicle V.

Figure 16:
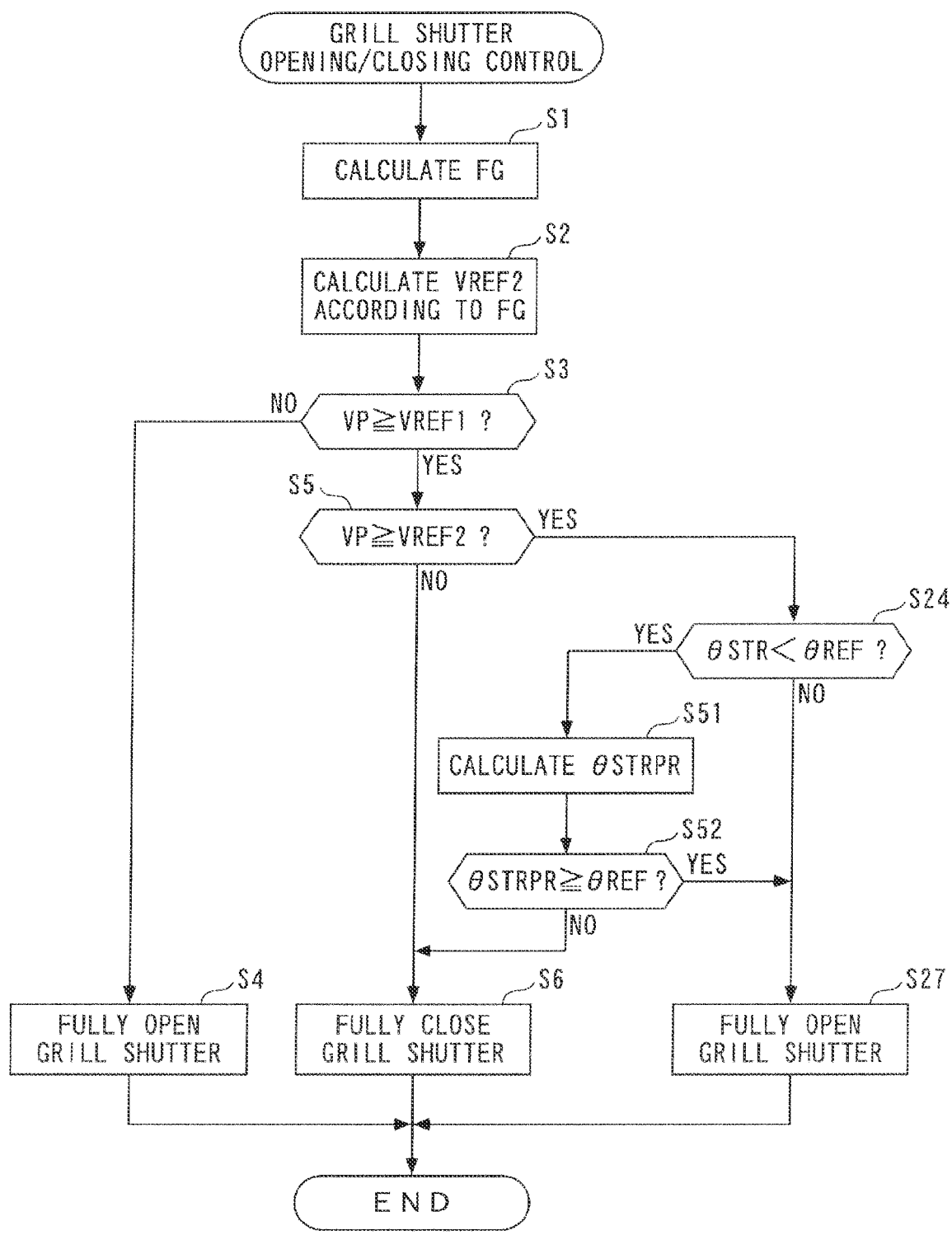
FIG. 16 A flowchart showing an opening/closing control process for a grille shutter according to a third embodiment.

FIG. 16 shows an opening/closing control process for the grille shutter 47 according to a third embodiment of the present invention. This opening/closing control process is formed by adding a process for opening or closing the grille shutter 47 according to a result of prediction of a change in the steering angle θSTR when the vehicle speed VP is not smaller than the second reference value VREF2, to the opening/closing control process according to the second embodiment shown in FIG. 11, and omitting the processes for setting the vehicle speed flag F_VP and the opening inhibition flag F_STR. Note that, in FIG. 16, steps which are identical in execution details of corresponding steps of the opening/closing control process in FIG. 11 are denoted by the same step numbers.

In the present process, the steps 1 to 4 are executed, similarly to the opening/closing control process in FIG. 11, and if the vehicle speed VP is smaller than the first reference value VREF1, the grille shutter 47 is controlled to the fully opened state, followed by terminating the present process. Further, if the answer to the question of the step 3 is YES and the vehicle speed VP is not smaller than the second reference value VREF2, the step 6 is executed, to control the grille shutter 47 to the fully closed state, followed by terminating the present process.

If the answer to the question of the step 5 is YES, which means that the vehicle speed VP is not smaller than the second reference value VREF2, similarly to the opening/closing control process in FIG. 11, it is determined whether or not the steering angle θSTR is smaller than the predetermined value θREF (step 24), and if the answer to this question is NO, the grille shutter 47 is controlled to the fully opened state (step 27), followed by terminating the present process.

On the other hand, if the answer to the question of the step 24 is YES, a steering angle predictive value θSTRPR is calculated (step 51). The steering angle predictive value θSTRPR is a predicted value of the steering angle θSTR to be assumed when a predetermined time period elapses from the present time, and for example, is calculated according to road information stored in a car navigation system (not shown) mounted in the vehicle V and the vehicle speed VP.

Next, in a step 52, it is determined whether or not the steering angle predictive value θSTRPR is not smaller than the predetermined value θREF. If the answer to this question is NO, which means that it is predicted that the steering angle θSTR will not exceed the predetermined value θREF when the predetermined time period elapses from the present time, it is determined that the opening of the grille shutter 47 is to be inhibited, and the process proceeds to the above-mentioned step 6 to thereby control the grille shutter 47 to the fully closed state, followed by terminating the present process.

On the other hand, if the answer to the question of the step 52 is YES, which means that θSTRPR≥θREF holds, i.e. if, in the state in which the opening of the grille shutter 47 is inhibited, it is predicted that the steering angle θSTR will be not smaller than the predetermined value θREF when the predetermined time period elapses from the present time, the process proceeds to the above-mentioned step 27 to thereby control the grille shutter 47 to the fully opened state, followed by terminating the present process.

As described above, according to the present embodiment, since the vehicle speed VP is not smaller than the second reference value VREF2 and the steering angle θSTR is smaller than the predetermined value θREF, in the state in which the opening of the grille shutter 47 is inhibited, when the steering angle predictive value θSTRPR becomes not smaller than the predetermined value θREF, the grille shutter 47 is opened in advance, before the steering angle θSTR changes. Therefore, it is possible to avoid oversteering when the steering angle θSTR has changed and further improve the maneuverability.

Note that, the present invention is by no means limited to the above-described embodiments, but can be practiced in various forms. For example, in the first embodiment, although when the vehicle speed VP is not smaller than the second reference value VREF2, by the opening control in the step 8, the target shutter opening degree θSCMD is variably controlled, instead of this, the grille shutter 47 may be controlled to a predetermined opening degree, for example, to the fully opened state. Further, although the grille shutter 47 is formed such that the opening degree thereof is variable, it can be of a type which can be switched between the fully opened state and the fully closed state.

Further, in the first embodiment, although the second reference value VREF2 is set according to the grip force FG (step 2), and even when the vehicle speed VP is not smaller than the second reference value VREF2, if the steering angle θSTR is not larger than the predetermined value θREF, the opening of the grille shutter 47 is inhibited (steps 6, 7), only one of these controls may be performed. The same goes for the second and third embodiments.

Further, in the first embodiment, although the target shutter opening degree θSCMD is corrected according to the grip force FG and the steering angle θSTR, one or both of these corrections may be omitted. Further, although detection of the steering angle θSTR is performed based on the angle of the front wheel, this is not limitative, but it may be performed based on the angle of a steering wheel. Further, although the sinking amount AVBODY is calculated according to the vehicle speed VP and the shutter opening degree θSA, it may be detected directly by using a pitching sensor.

Further, in the second embodiment, although the second opening/closing speed VS2 is set by correcting the basic value VSB thereof using the second steering angle-dependent correction coefficient KS2, etc., the second opening/closing speed VS2 may be set to a predetermined value. Further, although the first opening/closing speed VS1 is set to a predetermined value, it may be corrected according to the vehicle speed VP, etc. In either case, the second opening/closing speed VS2 is set to a smaller value than the first opening/closing speed VS1.

Further, in the third embodiment, although the steering angle predictive value θSTRPR is calculated by using the road information stored in the car navigation system, instead of this, it may be calculated by using the information detected by the Lane Keeping Assist System.

Further, in the first embodiment, and in the second and third embodiments, although the same values VREF1 and VREF2 are commonly used as the first reference value and the second reference value which are compared with the vehicle speed VP, values different from each other may be used. The same goes for the predetermined value which is compared with the steering angle θSTR.

Further, in the embodiments, although the grip force FG is calculated based on a plurality of parameters, such as the vehicle speed VP, the slope of the traveling road surface, the conditions of the road surface, and the air pressures of the tires, etc., the grip force FG may be calculated based on at least one selected from these parameters. It is to be further understood that various changes and modifications may be made without departing from the spirit and scope of the present invention.

INDUSTRIAL APPLICABILITY

As described heretofore, the opening/closing control device according to the present invention is useful for appropriately controlling the opening/closing of the grille shutter mechanism for introducing ambient air into the engine room of the vehicle according to the traveling conditions of the vehicle.

REFERENCE SIGNS LIST 1 opening/closing control device
2 ECU (first opening/closing control means, second opening/closing control means, opening condition-setting means, grip force detection means, sinking amount detection means, opening degree-setting means, shutter opening/closing means, opening/closing speed-setting means, opening inhibition means, steering angle change rate calculation means, prediction means)
21 vehicle speed sensor (vehicle speed detection means)
22 steering sensor (steering angle detection means)
42 front grille (front opening)
47 grille shutter (shutter)
V vehicle
B body
FG grip force of vehicle
VP vehicle speed
VREF1 first reference value
VREF2 second reference value
θSTR steering angle
θREF predetermined value
θSCMD target shutter opening degree (opening degree of shutter opened by second opening/closing control means)
AVBODY sinking amount of vehicle
ΔθSTR steering angle change rate (rate of change of steering angle)
VS1 first opening/closing speed
VS2 second opening/closing speed

The invention claimed is:

1. An opening/closing control device for a shutter of a vehicle, for controlling opening/closing of a shutter that is open ably and closably provided at a front part of a vehicle and introduces ambient air into an engine room through a front opening, comprising:
vehicle speed detection means for detecting a speed of the vehicle as a vehicle speed;
first control means for closing the shutter when the detected vehicle speed is not smaller than a predetermined first reference value and smaller than a second reference value which is larger than the first reference value;
second control means for opening the shutter when the vehicle speed is not smaller than the second reference value;
opening condition-setting means for setting a condition for opening the shutter by said second control means according to at least one of a grip force of the vehicle and a steering angle.

2. The opening/closing control device as claimed in claim 1, further comprising grip force detection means for detecting the grip force of the vehicle, and
wherein said opening condition-setting means sets the second reference value to a larger value as the detected grip force is smaller.

3. The opening/closing control device as claimed in claim 1, further comprising steering angle detection means for detecting the steering angle of the vehicle, and
wherein said opening condition-setting means inhibits the opening of the shutter when the detected steering angle is not larger than a predetermined value.

4. The opening/closing control device as claimed in claim 1, wherein the shutter is formed such that an opening degree thereof is variable, the opening/closing control device further comprising:
sinking amount acquisition means for acquiring a sinking amount of the front part of the vehicle body of the vehicle; and
opening degree-setting means for setting the opening degree of the shutter to be opened by said second control means according to the acquired sinking amount of the vehicle body.

5. The opening/closing control device as claimed in claim 4, wherein said sinking amount acquisition means calculates the sinking amount based on the vehicle speed.

6. The opening/closing control device as claimed in claim 4, further comprising grip force detection means for detecting the grip force of the vehicle, and
wherein said opening degree-setting means sets the opening degree of the shutter to a larger value as the detected grip force is larger.

7. An opening/closing control device for a shutter of a vehicle, for controlling opening/closing of a shutter that is openably and closably provided at a front part of a vehicle and introduces ambient air into an engine room through a front opening, comprising:
vehicle speed detection means for detecting a speed of the vehicle as a vehicle speed,
shutter control means for opening the shutter when the detected vehicle speed is smaller than a predetermined first reference value, closing the shutter when the vehicle speed is not smaller than the first reference value and smaller than a second reference value which is larger than the first reference value, and opening the shutter when the vehicle speed is not smaller than the second reference value, and
opening/closing speed-setting means for setting a second opening/closing speed which is a shutter opening/closing speed when the vehicle speed has changed across the second reference value to a smaller value than a first opening/closing speed which is a shutter opening/closing speed when the vehicle speed has changed across the first reference value.

8. The opening/closing control device as claimed in claim 7, further comprising steering angle detection means for detecting a steering angle of the vehicle, and
wherein said opening/closing speed-setting means corrects the second opening/closing speed according to the detected steering angle.

9. The opening/closing control device as claimed in claim 8, further comprising opening inhibition means for inhibiting the opening of the shutter when the vehicle speed is not smaller than the second reference value and the steering angle is smaller than a predetermined value.

10. The opening/closing control device as claimed in claim 9, further comprising steering angle change rate calculation means for calculating a rate of change of the steering angle, and
wherein in a state in which the opening of the shutter is inhibited by said opening inhibition means, when the steering angle becomes not smaller than the predetermined value, said opening/closing speed-setting means corrects the second opening/closing speed according to the calculated rate of change of the steering angle.

11. The opening/closing control device as claimed in claim 7, further comprising grip force detection means for detecting a grip force of the vehicle, and
wherein said opening/closing speed-setting means corrects the second opening/closing speed according to the detected grip force.

12. The opening/closing control device as claimed in claim 9, further comprising prediction means for predicting a change in the steering angle, and
wherein in a state in which the opening of the shutter is inhibited by said opening inhibition means, when the steering angle is predicted to change to not smaller than the predetermined value, said shutter control means opens the shutter before the steering angle changes.

13. The opening/closing control device as claimed in claim 2, further comprising steering angle detection means for detecting the steering angle of the vehicle, and
wherein said opening condition-setting means inhibits the opening of the shutter when the detected steering angle is not larger than a predetermined value.

14. The opening/closing control device as claimed in claim 2, wherein the shutter is formed such that an opening degree thereof is variable, the opening/closing control device further comprising:
sinking amount acquisition means for acquiring a sinking amount of the front part of the vehicle body of the vehicle; and
opening degree-setting means for setting the opening degree of the shutter to be opened by said second control means according to the acquired sinking amount of the vehicle body.

15. The opening/closing control device as claimed in claim 14, wherein said sinking amount acquisition means calculates the sinking amount based on the vehicle speed.

16. The opening/closing control device as claimed in claim 14, further comprising grip force detection means for detecting the grip force of the vehicle, and
wherein said opening degree-setting means sets the opening degree of the shutter to a larger value as the detected grip force is larger.

17. The opening/closing control device as claimed in claim 3, wherein the shutter is formed such that an opening degree thereof is variable, the opening/closing control device further comprising:
sinking amount acquisition means for acquiring a sinking amount of the front part of the vehicle body of the vehicle; and
opening degree-setting means for setting the opening degree of the shutter to be opened by said second control means according to the acquired sinking amount of the vehicle body.

18. The opening/closing control device as claimed in claim 17, wherein said sinking amount acquisition means calculates the sinking amount based on the vehicle speed.

19. The opening/closing control device as claimed in claim 17, further comprising grip force detection means for detecting the grip force of the vehicle, and
wherein said opening degree-setting means sets the opening degree of the shutter to a larger value as the detected grip force is larger.

20. The opening/closing control device as claimed in claim 5, further comprising grip force detection means for detecting the grip force of the vehicle, and
wherein said opening degree-setting means sets the opening degree of the shutter to a larger value as the detected grip force is larger.

* * * * *